(12) United States Patent
Fields et al.

(10) Patent No.: US 8,229,963 B2
(45) Date of Patent: Jul. 24, 2012

(54) SCHEMA FOR FEDERATED SEARCHING

(75) Inventors: David Fields, Kirkland, WA (US); Paolo Marcucci, Seattle, WA (US); Carlos Brito, Sammamish, WA (US); Chris McConnell, Redmond, WA (US); Scott Hysom, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 292 days.

(21) Appl. No.: 12/054,998

(22) Filed: Mar. 25, 2008

(65) Prior Publication Data

US 2009/0248706 A1  Oct. 1, 2009

(51) Int. Cl.
*G06F 7/00* (2006.01)
*G06F 17/30* (2006.01)

(52) U.S. Cl. ......................... 707/793; 707/803
(58) Field of Classification Search .................. 707/802, 707/803, 793
See application file for complete search history.

(56) References Cited

U.S. PATENT DOCUMENTS

| | | | |
|---|---|---|---|
| 5,806,066 A | 9/1998 | Golshani et al. | |
| 5,809,497 A * | 9/1998 | Freund et al. .......................... | 1/1 |
| 5,970,490 A | 10/1999 | Morgenstern | |
| 6,161,103 A | 12/2000 | Rauer | |
| 6,374,252 B1 | 4/2002 | Althoff et al. | |
| 6,578,046 B2 | 6/2003 | Chang | |
| 6,662,179 B2 | 12/2003 | Benjamin et al. | |
| 7,133,871 B2 * | 11/2006 | Sluiman ................................ | 1/1 |
| 7,162,488 B2 | 1/2007 | DeVorchik | |
| 7,177,862 B2 | 2/2007 | Zhang | |
| 2003/0028511 A1 | 2/2003 | Sluiman | |
| 2004/0225669 A1 | 11/2004 | Isaacson et al. | |
| 2005/0060337 A1 | 3/2005 | Chou | |
| 2005/0149496 A1 | 7/2005 | Mukherjee | |
| 2006/0173868 A1 | 8/2006 | Angele et al. | |
| 2006/0253421 A1 | 11/2006 | Chen | |
| 2006/0253459 A1 | 11/2006 | Kahn | |
| 2006/0259462 A1 | 11/2006 | Timmons | |
| 2007/0078824 A1 | 4/2007 | Dorgelo | |
| 2008/0027930 A1 | 1/2008 | Bohannon et al. | |

OTHER PUBLICATIONS

International Search Report for PCT/US2009/035529, Jul. 23, 2009.
Michael Douma, PHP Search Engine Showdown, http://www.onlamp.com/lpt/a/6466, Mar. 23, 2007.
Introduction to Oracle Secure Enterprise Search, http://docs.huihoo.com/oracle/docs/B28527_01/doc/search.1016/ b19002/over.htm, Oct. 24, 2007.
Non Final Office Action of U.S. Appl. No. 12/055,012, mailed Sep. 9, 2010.
Final Office Action mailed Jan. 24, 2011 regarding U.S. Appl. No. 12/055,012, 12 pages.
Notice of Allowance of U.S. Appl. No. 12/055,012, mailed Sep. 30, 2011.

* cited by examiner

*Primary Examiner* — Charles Lu
(74) *Attorney, Agent, or Firm* — Shook, Hardy & Bacon LLP (57) ABSTRACT

Embodiments of the present invention provide a schema to describe the structure of a data store that may be used to query the data store. The schema may include a property description describing static and contextual attributes of a property of the data store. The schema may also include a property reference describing contextual attributes of a property of the data store, while referencing static attributes from a property description in another schema. In some instances, the schema may further describe item types and/or kinds for the data store.

16 Claims, 6 Drawing Sheets

SCHEMA FOR FEDERATED SEARCHING

BACKGROUND

Although computer systems can store a wealth of information, it can often be difficult for users to find or retrieve a specific document or piece of information. In particular, the amount of information and content stored by and available from computing devices and the Internet continues to grow exponentially. Given the vast amount of information, search engines and other data querying tools have been developed to facilitate searching for documents and information from data stores.

Typically, search engines and other data querying tools are configured to interact with and search a single data store. However, users may often wish to simultaneously search multiple data stores, known as federated searching. Federated search scenarios, though, present challenges as data store providers often maintain their data in data stores having different structures, which makes it difficult to search over the multiple data stores. In particular, a schema is typically used to provide information about the structure of the data in a structured data store. Different data stores typically use a different schema, making it difficult to operate seamlessly over all the data stores.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to a schema format that allows data source providers to generate schemas to describe aspects of their data stores. The schemas may be used by computing devices to interact with and search the data stores. A schema may include a property description that describes static information and contextual information for a property of a data store. The static information may be referenced by another schema using a property reference. A property reference provides contextual information to describe a property of an associated data store while referencing static information from a property description in another schema. In some embodiments, a schema may include information to describe an item type and/or a kind for a data store.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Overview

Embodiments of the present invention provide a schema format that allows data store providers to fully and richly describe the structure of their data stores using custom properties, property references, items types, and kinds. Although data store providers may define schemas to describe their data stores in accordance with embodiments of the present invention, the schemas are configured such that they may be aggregated for federated search scenarios. Accordingly, a computing device may use multiple schemas in accordance with the schema format described herein to allow a user to interact with and search multiple data stores having different data structures described by those schemas.

For example, a user may want to search a data store associated with online book retailer 1 and a second data store associated with online book retailer 2. A typical search may look for a book based on title, author, publisher, or other such information. This information is stored in both data stores in a manner defined by schemas used to describe the respective data stores. Among other things, the schema describes properties of the data store by setting forth attributes of the properties. Property attributes in the schema should not be confused with the property values in the data store. For example, Jack London could be a property value in the author field in the data store, whereas the property description in the schema contains the attributes (e.g. field length, number of authors, type) that define the type of data that can be stored in the author field in the data store.

In embodiments of the present invention, the two data stores may contain the same property having identical static attributes and potentially different contextual attributes. For example, the name of the property (e.g., "author") is a static attribute that would need to be the same for both schemas. On the other hand, the field length attribute could be different in the data stores and is, therefore, a contextual attribute. Embodiments of the present invention provide a schema format that, among other things, allows schemas to be aggregated and used by applications to search and present data from both data stores. For example, an aggregated property description for the author property would contain the static information defined by one schema and the contextual information define by both schemas. One method for aggregating schemas is described in U.S. patent application Ser. No. 12/055,012, filed on even date herewith, entitled "AGGREGATING SCHEMA DATA FROM MULTIPLE SOURCES."

A schema in accordance with embodiments of the present invention may include a property description that includes both static information and contextual information to describe a property of its associated data store. While the contextual information is specific to the property for the present data store, the static information from the property description applies to that property in all data stores. In particular, other schemas may include a property reference that references the static information from the property description in the first schema and then sets forth the contextual information for the property for their respective data stores. In other words, multiple data stores may include the same property. The static information for that property will be set forth by a property description in one schema and will be referenced by a property reference in other schemas. Each schema will then specify the contextual information for that property that is particular to its respective data store (one schema sets forth the contextual information in a property description, while the other schemas set forth the contextual information in a property reference.)

In some embodiments, a schema may include one or more of additional elements, including an item type description and a kind description. Generally, an item type description is used to define an item type (e.g., an MP3 file) to describe items in a data store. The item type description provides a list of properties associated with the item type. The kind description is used to define a kind (e.g., music) to describe items in a data store. The kind description provides a list of properties associated with the kind.

Accordingly, in one embodiment of the invention, an aspect is directed to a computing device having a processor and implementing a schema for querying a data store described by the schema. The schema is stored as a data structure on one or more computer-storage media accessible by the processor. The schema includes at least one property reference describing at least one property of the data store. The property reference includes contextual information to describe the property and references a second schema for static information to describe the property.

In another aspect, an embodiment of the invention is directed to one or more computer-storage media having embodied thereon a data structure for a schema describing a data store. The data structure is useable by a computing device to query the data store. The data structure includes one or more property descriptions describing one or more properties of the data store. Each property description includes one or more static attributes and one or more contextual attributes to describe one of the properties. Each static attribute has a corresponding static attribute value, and each contextual attribute has a corresponding contextual attribute value. The data structure also includes one or more property references describing one or more other properties of the data store. Each property reference includes one or more contextual attributes and references a property description from a second schema for one or more static attributes. Each contextual attribute of each property reference has a corresponding contextual attribute value to describe one of other properties. Static attributes and corresponding static attribute values from the property description from the second schema are also used to describe one of the other properties.

A further embodiment of the present invention is directed to one or more computer-storage media comprising a schema for describing a data store, the schema being useable to interact with the data store. The schema includes at least one property description describing at least one property of the data store, the property description including both static information to describe the property for any schema and contextual information to describe the property for the schema. The schema also includes at least one property reference describing at least one other property of the data store, the property reference including a reference to a property description in a second schema for static information to describe the other property, the property reference also including contextual information to describe the other property. The schema further includes at least one item type description describing at least one item type for at least one item in the data store, the item type description including one or more properties for the item type. The schema still further includes at least one kind description describing at least one kind for at least one item in the data store, the kind description including one or more properties for the kind. The schema is stored on one or more computer-readable media.

Exemplary Operating Environment

Figure 1:
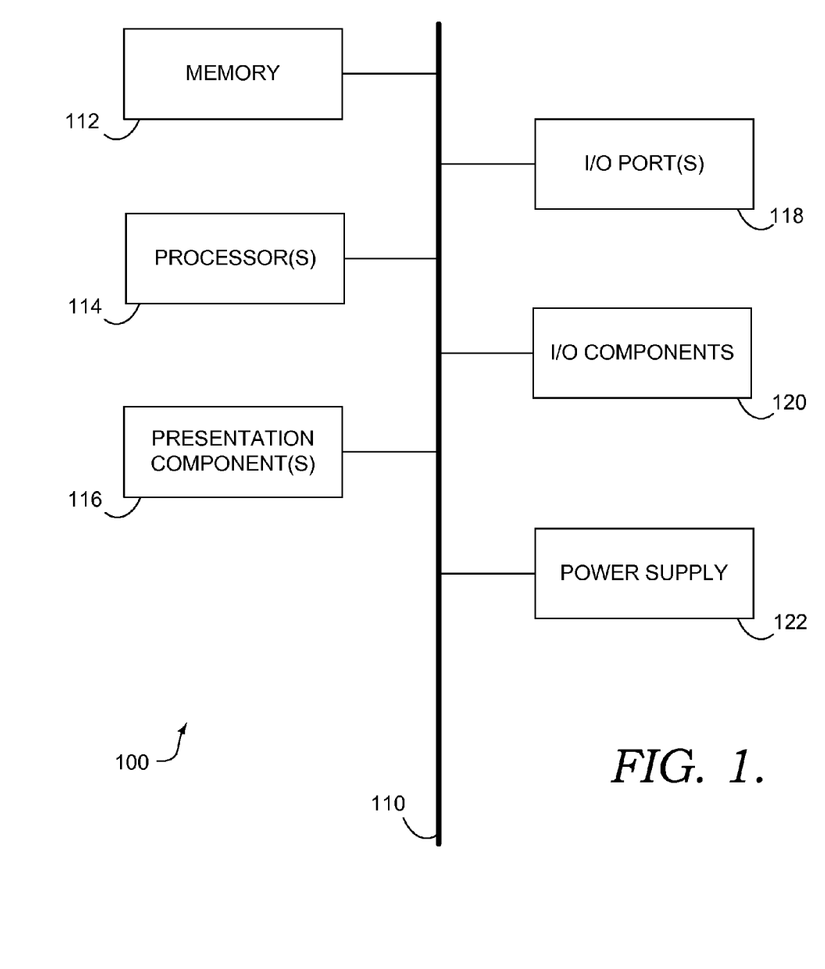
FIG. 1 is a block diagram of an exemplary computing environment suitable for use in implementing the present invention.

Having briefly described an overview of the present invention, an exemplary operating environment in which various aspects of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Schema Overview

Figure 2:
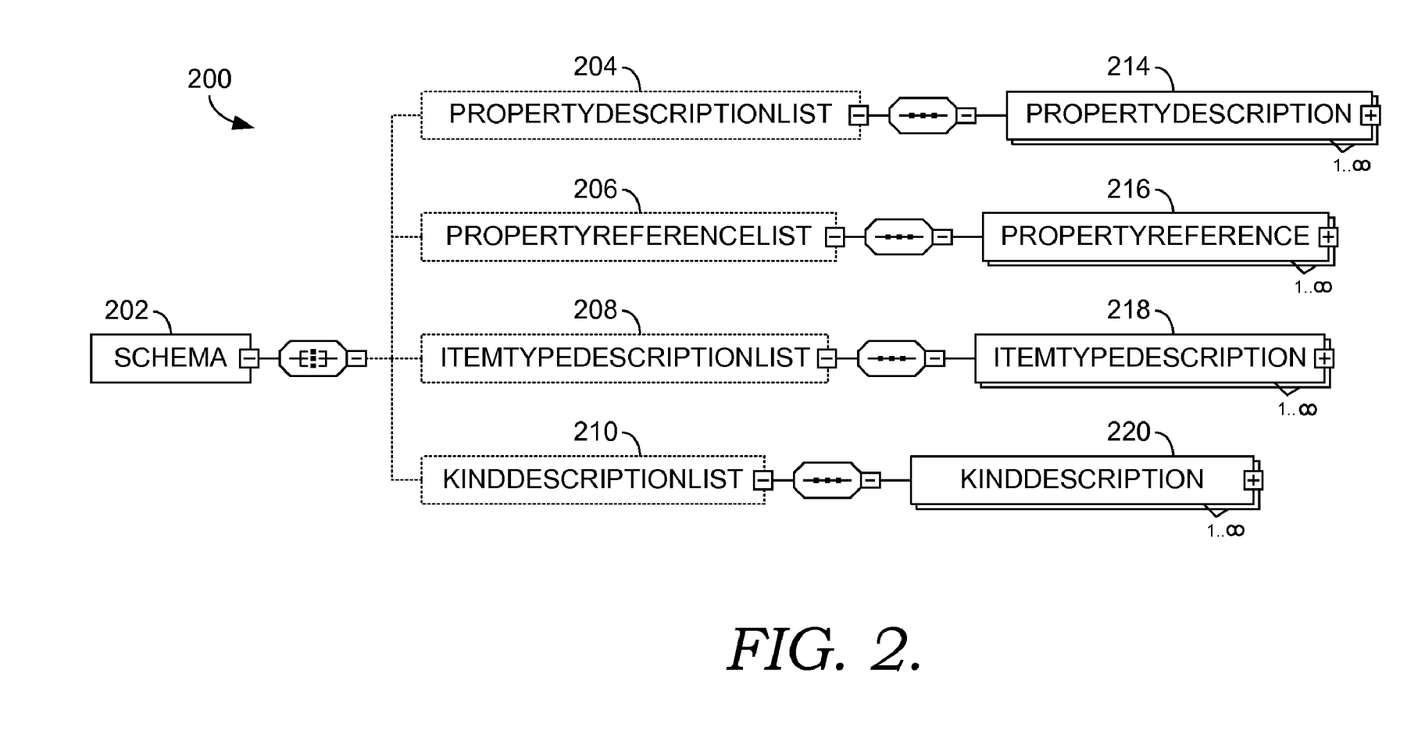
FIG. 2 is a diagram of an exemplary schema description format in accordance with an embodiment of the present invention.

Referring now to FIG. 2, a diagram is provided illustrating an exemplary schema description format 200 in accordance with an embodiment of the present invention. Generally, the diagram in FIG. 2 illustrates the top level elements that may be included within a schema in accordance with embodiments of the present invention. As shown in FIG. 2, the <schema> root element 202 may include zero or more of each of the following top level elements: <propertyDescriptionList> 204, <propertyReferenceList> 206, <itemTypeDescriptionList> 208, <kindDescriptionList> 210.

Each of the top level elements 202, 204, 206, 208, and 210 acts as a container to list corresponding elements that will be described in further detail below with reference to FIGS. 3 through 7. Generally, the <propertyDescriptionList> element 204 is a list of all the new properties defined in the schema. The <propertyReferenceList> element 206 is a list of all existing and external properties that are included in another schema and are being referenced in the present schema. The <itemTypeDescriptionList> element 208 is a list of all new item types defined in the schema. The <kindDescriptionList> element 210 is a list of kinds-related property lists defined in the schema.

Property Descriptions

A schema may define one or more properties of a data store that the schema describes by defining attributes of those properties. A property is a component of a schema that may be utilized to describe aspects of the data structure. A property is described by a property description using attributes that are associated with attribute values. For example, a property attribute might be "name" and an associated attribute value could be "Author." Thus, the name of the property would be author. Examples of the attributes that might be used to describe a property include field length, data type, data format, label, the maximum value, the minimum value and is the property queryable. The associated attribute value for an attribute could be a number (e.g., integer, floating point, etc.), true/false, a text string or some other description. In general, several attributes are used to describe a single property.

In some embodiments, a property is described by a property description that sets forth a collection of static attributes and a collection of contextual attributes. The static attributes and attribute values are immutable and will be the same for all schemas having the property. As will be described in further detail below, other schemas having the same property that is defined by a property description in another schema will reference that schema and property description for the static attributes and values. The contextual attributes and attribute values may vary among schemas and will be defined by each schema. However, it is possible for schemas to include the same contextual attributes with the same attributes.

Generally, an attribute may be designated as static if it must have the same value across multiple schemas to maintain the fundamental character of the property. If the attribute values may be changed to suit individual data stores, without destroying the fundamental character of the property, then it may be classified as a contextual attribute. Thus, a property description describes a property by setting forth the static and contextual attributes included in the property and the attribute values associated with the respective attributes. The static attributes of the property description apply to all schemas that include the property including the schema with the property description and other schemas that reference the property description for that schema (e.g., as will be described in further detail below). The contextual attributes of the proper description apply to only the schema including the property description.

Referring again to FIG. 2, the <propertyDescriptionList> element 204 lists the properties that are defined by the schema. If a schema includes the <propertyDescriptionList> element 204, the schema will include one or more <propertyDescription> elements 214. In particular, a <propertyDescription> element 214 is provided for each property defined by the schema. Each <propertyDescription> element 214 sets forth the attributes for a given property of the data store.

Figure 3:
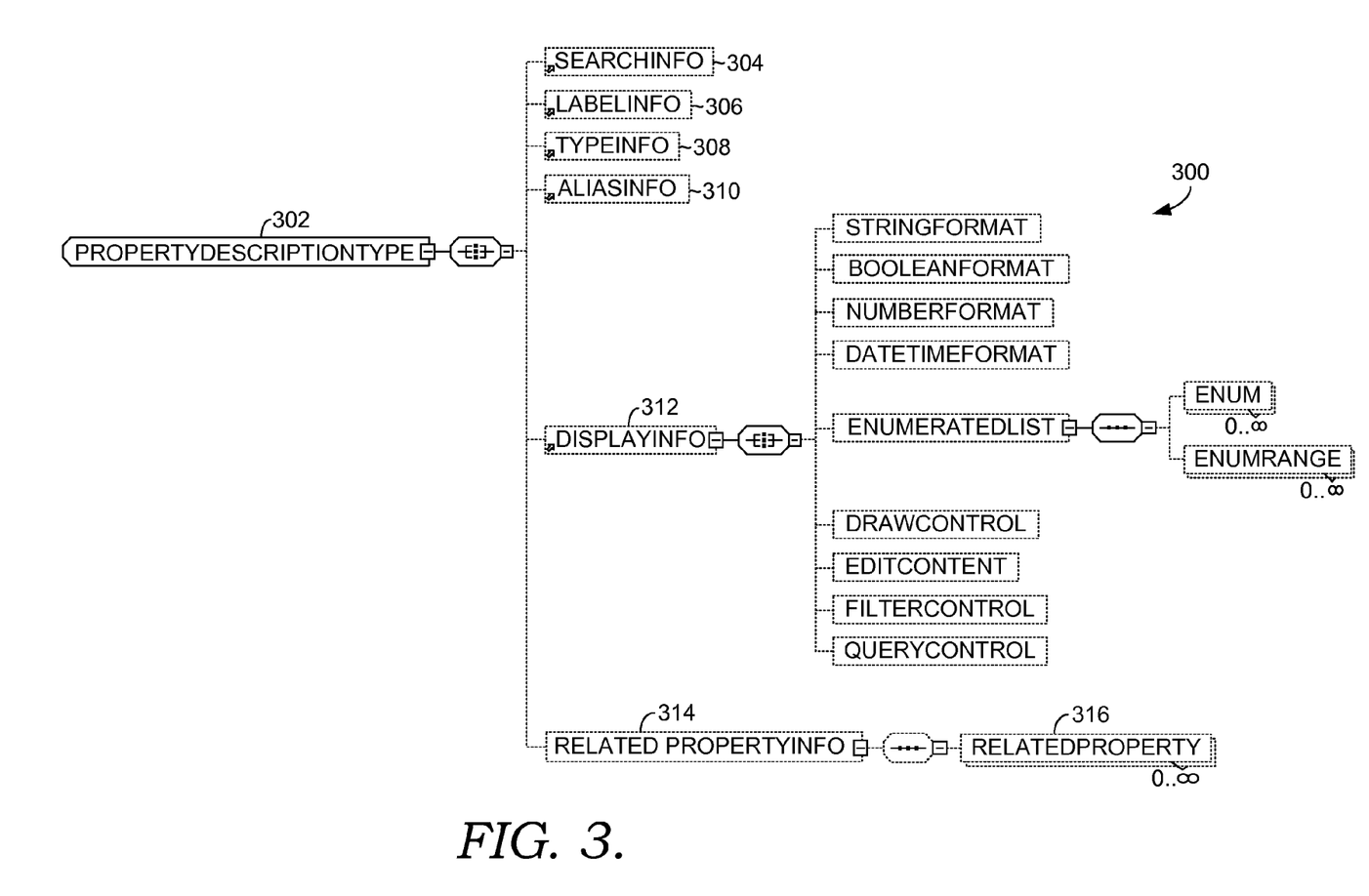
FIG. 3 is a diagram of an exemplary property description element of a schema in accordance with an embodiment of the present invention.

Turning FIG. 3, a diagram is provided illustrating details of a <propertyDescription> element 300 in accordance with an embodiment of the present invention. As shown in FIG. 3, the <propertyDescription> element 300 is of a propertyDescriptionType 302 and includes a number of child elements including a <searchinfo> element 304, <labelinfo> element 306, <typeinfo> element 308, <aliasinfo> element 310, <displayinfo> element 312, and a <relatedPropertyInfo> element 314. The <searchinfo> element 304 describes how a search indexer will use the property. The <labelinfo> element 306 provides user-friendly localizable information for identifying the property in a user interface. The <typeinfo> element 308 describes the format and constraints of values of the property, such as, for instance, a vector of strings with at most 12 elements. The <aliasinfo> element 310 identifies other properties that should be used in addition to or in place of this property in certain contexts, such as, for instance, when sorting items based on the property. The <displayinfo> element 312 provides information about how to format and display values of the property in the user interface. The <relatedPropertyInfo> element 314 contains one or more <relatedProperty> elements 316 that each define a relationship between property descriptions. This allows for properties to be tied together in various relationships. A <relatedProperty> element 316 includes attributes to identify a property that is related to the property described by the current <propertyDescription> element 300 and a type of relationship between the properties.

Each of the child elements include attributes for defining the property described by the <propertyDescription> element 300. As noted above, some of the attributes will be static attributes that will apply to the current schema, as well as to other schemas that reference this property description. Additionally, some of the attributes will be contextual attributes that apply only to the current schema.

Property References

As noted above, a schema may refer to properties that are defined in other schemas by using property references. A property reference refers to a property description in another schema, such that the static attributes and attribute values from that property description are used to describe a given property for a data store. Additionally, the property reference includes contextual attributes and attribute values to describe the property for that data store. Together, the static attributes and values from the referenced property description and the contextual attributes and values defined by the property reference describe a property of the data store.

Referring again to FIG. 2, a schema may include a <propertyReferenceList> element 206. The <propertyReferenceList> element 206 refers to another schema and acts as a container for one or more <propertyReference> elements 216. If a schema includes a <propertyReferenceList> element 206, the schema will include one or more <propertyReference> elements 216. Each <propertyReference> element 206 references a property description from the other schema referenced by the <propertyReferenceList> element 206 for the static attributes and values. Each <propertyReference> element 206 also sets forth the contextual attributes and values for the present schema.

In some embodiments, a schema may include more than one <propertyReferenceList> element 206, with each referring to a different schema. For example, a schema may include a first <propertyReferenceList> element 206 that references a first schema for a local data store on a computer and a second <propertyReferenceList> element 206 that references a second schema stored externally. In some embodiments, a universal resource indicator (URI) indicating a location for a schema is used to reference that schema, although other methods of referencing schemas may be employed in various embodiments of the present invention.

Figure 4:
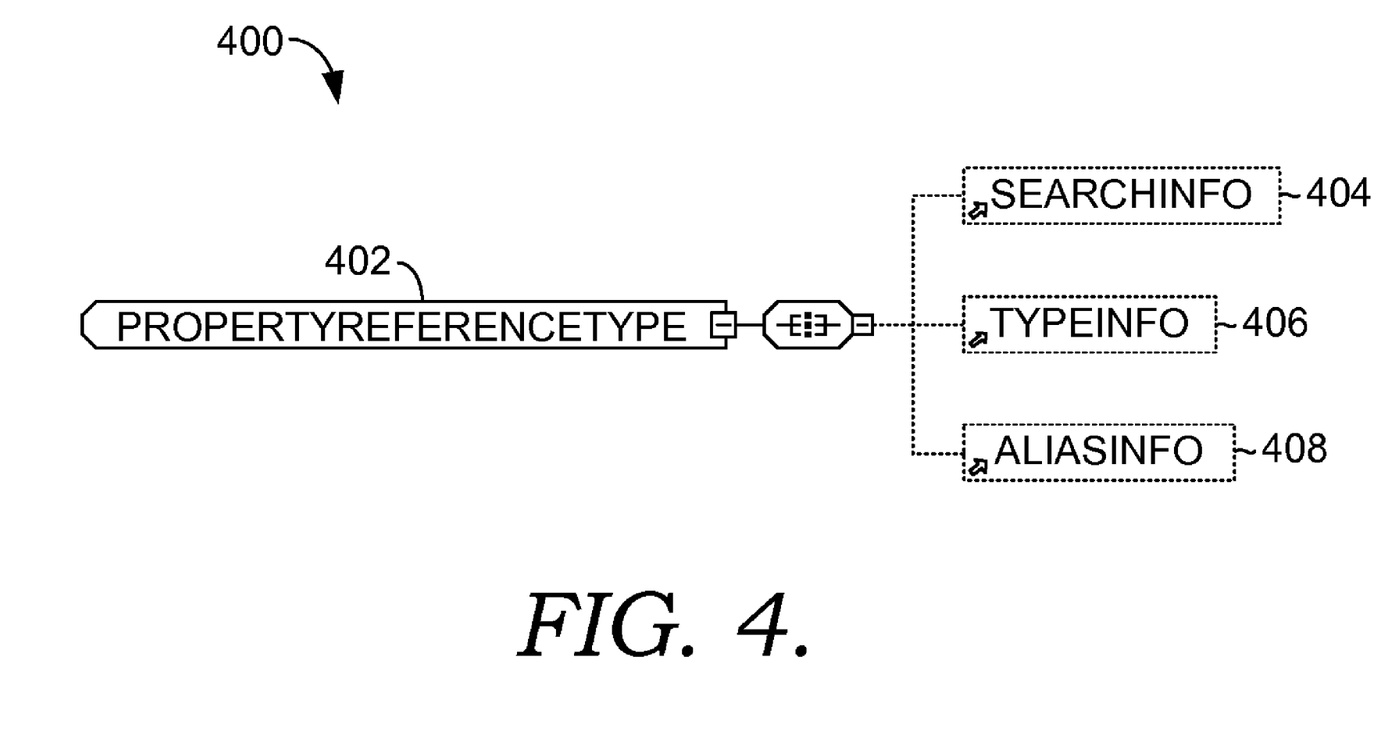
FIG. 4 is a diagram of an exemplary property reference element of a schema in accordance with an embodiment of the present invention.

Turning now to FIG. 4, a diagram is provided illustrating a format for a <propertyReference> element 400 in accordance with an embodiment of the present invention. The <propertyReference> element 400 references a property description from a referenced schema for static attributes (and values) and specifies the contextual attributes (and values) for the present schema. As shown in FIG. 4, the <propertyReference> element 400 is of a propertyReferenceType 402 and includes several child elements, including a <searchInfo> element 404, a <typeInfo> element 406, and an <aliasInfo> element 408. Each of the child elements include the contextual attributes for defining the property described by the present <propertyReference> element 400. As shown in FIGS. 3 and 4, the <propertyDescription> element 300 and <propertyReference> element 400 may include the same child elements with similar attributes. However, as noted previously, a property description in one schema may have attribute values that differ from those in a property reference in another schema.

Item Type Descriptions

In embodiments of the present invention, the schema format allows data store providers to define new item types or modify existing ones by including one or more item type descriptions in a schema. An item type description is used to describe an item type, which represents the type of an item within a data store. For instance, a item such as a file may be identified as a given item type based on a file extension for the file. By way of example only and not limitation, an MP3 file (e.g., identified by the file extension .mp3) may be identified as an MP3 item type, which would be different from a WMA file (e.g., identified by the file extension .wma) identified as a WMA item type. A particular item may have only one item type such that there is a one to one correspondence between an item and an item type.

Generally, an item type description sets forth a list of properties for a given item type. The item type descriptions are used to enable a rich user interface to interact with items returned by a data source in search results. For example, an item type description may indicate to a user interface a set of properties that should be displayed for a given item type.

Referring again to FIG. 2, a schema may include a <itemTypeDescriptionList> element 208, which acts as a container for one or more <itemTypeDescription> elements 218. If a schema includes a <itemTypeDescriptionList> element 208, the schema will include one or more <itemTypeDescription> elements 218. Each <itemTypeDescription> element 218 describes a custom item type for items within the data store associated with the schema.

Figure 5:
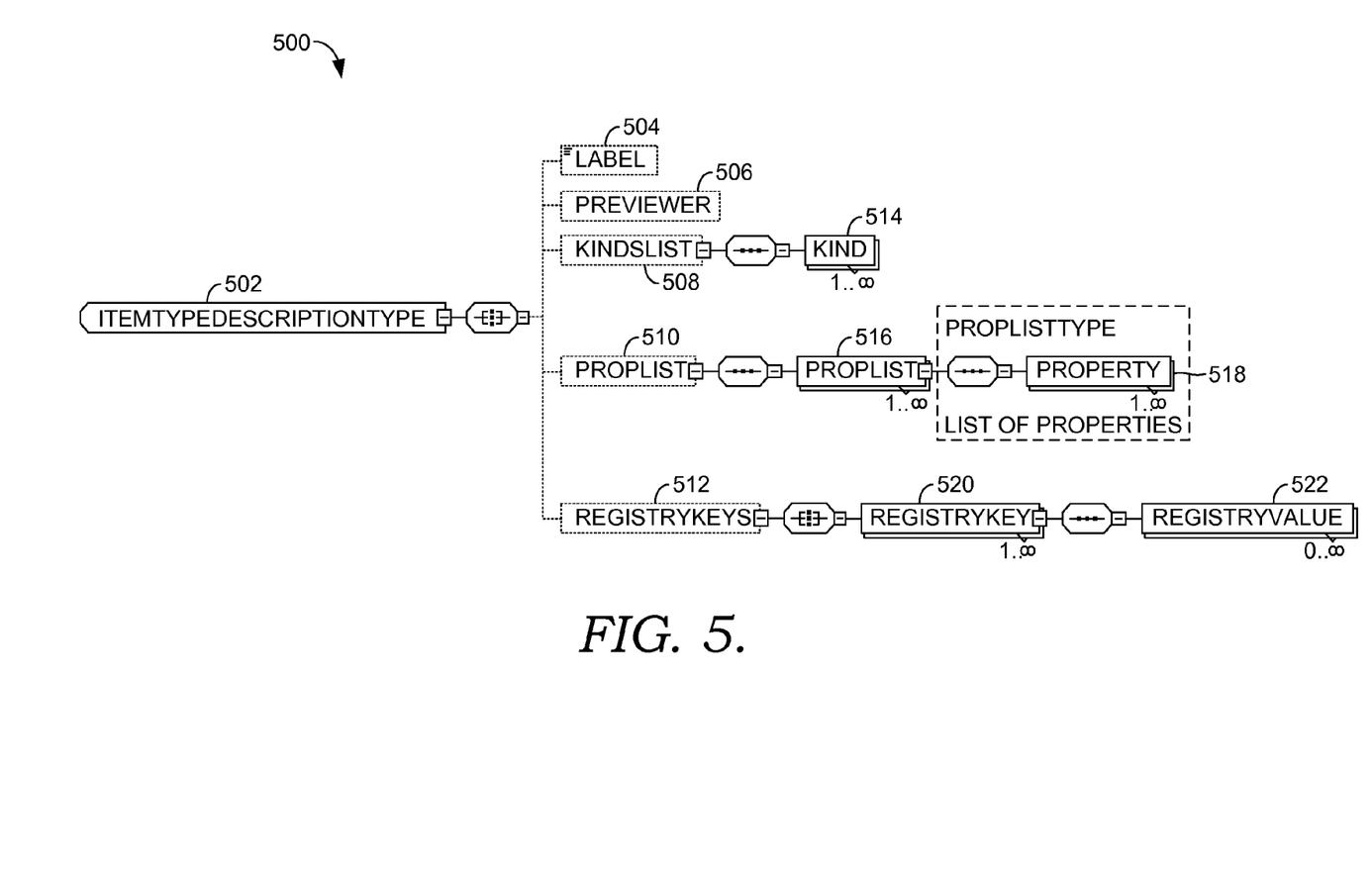
FIG. 5 is a diagram of an exemplary item type description element of a schema in accordance with an embodiment of the present invention.

Turning now to FIG. 5, a diagram is provided illustrating a format for a <itemTypeDescription> element 500 in accordance with an embodiment of the present invention. As shown in FIG. 5, the <itemTypeDescription> element 500 is of a itemTypeDescriptionType 502 and includes a number of child elements including a <label> element 504, <previewer> element 506, <kindsList> element 508, <propLists> element 510, and <registryKeys> element 512.

Generally, the <label> element 504 contains a localizable friendly name for the item type. The <preview> element 506 specifies the class used as a preview handler for this item type. The <kindsList> element 508 contains a list of all the kinds 514 to which the item belongs. Kinds will be described in further detail below, but generally a kind is a collection of item types. The <propLists> element 510 contains a list of all the <proplist> elements 516 defined for the item type. Each <propList> element 516 includes a list of one or more <property> elements 518 for the item type. Each <property> element 518 includes one or more attributes to identify a given property. The <registrykeys> element 512 includes one or more <registrykey> elements 520 that each can be used to specify settings related to this item type, including zero or more registry values 522. There are some aspects of an item type's description that are not formally codified in the schema, or may be added in the future. From an implementation standpoint, most or all of these settings get translated into data in the registry, and this portion of the item type description provides a generic way to specify attributes of the item type description that are not part of the formal schema, but should still be populated in the registry data for the item type.

Kind Descriptions

In some embodiments, a data store provider can define a number of property lists that are tied to a specific kind. Kinds are collections of logically related item types. For instance, a "Music" kind may include an "MP3" item type (that corresponds with MP3 files) and a "WMA" item type (that corresponds with WMA files). Additionally, items, which may only correspond with a single item type, may belong to multiple kinds. For example, an email attachment may be assigned to both a "Documents" kind and a "Communications" kind.

Kind descriptions set forth a list of properties for a given kind to enable a rich user interface to interact with a data source and search results. For example, a user may wish to "find all the music on my computer." A kind description would provide information that allows for the identification of what file types are "music."

Referring again to FIG. 2, a schema may include a <kindDescriptionList> element 210, which acts as a container for one or more <kindDescription> elements 220. If a schema includes a <kindDescriptionList> element 210, the schema will include one or more <kindDescription> elements 220. Each <kindDescription> element 220 describes a custom kind specific to the data store associated with the schema.

Figure 6:
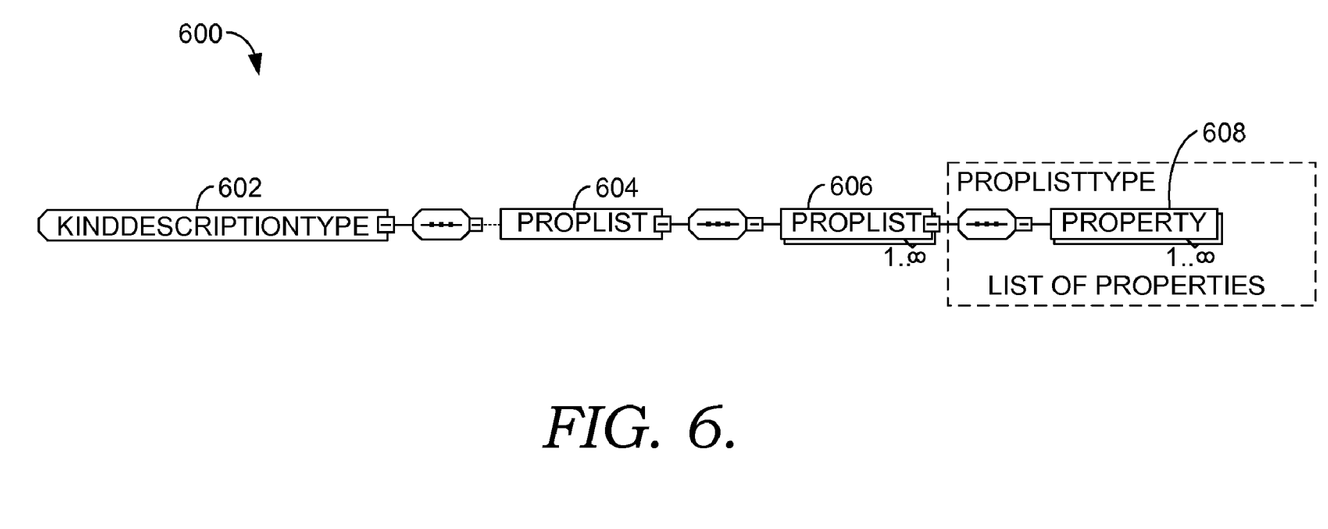
FIG. 6 is a diagram of an exemplary kind description element of a schema in accordance with an embodiment of the present invention.

Turning now to FIG. 6, a diagram is provided illustrating a format for a <kindDescription> element 600 in accordance with an embodiment of the present invention. As shown in FIG. 6, the <kindDescription> element 600 is of a kindDescriptionType 602 and includes a <propLists> element 604. The <propLists> element 604 contains a list of all the <proplist> elements 606 defined for the kind description. Each <propList> element 606 includes a list of one or more <property> elements 608 for the kind description. Each <property> element 608 includes one or more attributes to identify a given property.

Conclusion

As can be understood, embodiments of the present invention provide a schema format that allows data store providers to fully and richly describe the structure of their data stores. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computing device having a processor and implementing a first schema for querying a first data store described by the first schema, the first schema being stored as a data structure on one or more computer-storage media accessible by the processor, the first schema comprising:

a first property description element describing a first individual property of the data store including one or more static attributes and one or more contextual attributes that combine to describe the first individual property wherein each static attribute has a corresponding static attribute value and each contextual attribute has a corresponding contextual attribute value, wherein a static attribute associated with the first individual property is immutable and has the same static attribute value within all schemas that include the first individual property, wherein a contextual attribute is able to have different contextual attribute values among different schemas that include the first individual property, and wherein contextual attribute values are defined within each schema that has the contextual attribute;

a property reference element that defines a second individual property in the first data store by referencing a second property description element from a second schema that includes static attributes and corresponding static attribute values wherein the property reference specifies contextual attributes and corresponding contextual attribute values, wherein the static attributes apply to all schemas that reference the second property description element, and wherein the contextual attributes apply only to the first schema;

an item type description element describing an item type for at least one item in the data store, the item type description element including one or more properties that define the item type; and a kind description element describing a kind for at least one item in the data store, the kind description element including one or more properties for the kind, wherein the kind is a collection of logically related item types.

2. The computing device of claim 1, wherein the first schema further includes a second property description element describing a second property of the first data store, wherein the property description element includes both static attributes and contextual attributes to describe the second property.

3. The computing device of claim 2, wherein the static attributes in the second property description element are usable by at least one other schema for a different data store to describe the second property for the different data store, and wherein the contextual information is specific to the first schema.

4. The computing device of claim 2, wherein the first schema further comprises a property description list element that is a list of all new properties defined in the schema, and wherein the property description list element acts as a container for property descriptions within the first schema.

5. The computing device of claim 2, wherein the second property description element includes a related property element that defines a relationship between two property descriptions elements, wherein the related property element includes attributes that identify related properties and describe a type of relationship between the two property description elements.

6. The computing device of claim 1, wherein the first schema further comprises a property reference list element that acts as a container for one or more property reference elements within the first schema.

7. The computing device of claim 1, wherein the first schema further comprises an item type description list element containing a list of all item types defined within the first schema.

8. The computing device of claim 1, wherein the first schema further comprises a kind description list element that acts as a container for one or more kinds within the first schema.

9. One or more computer-storage media having embodied thereon a data structure for a first schema describing a data store, the data structure being useable by a computing device to query the data store, the data structure comprising:

a first property description element describing a first individual property of the data store including one or more static attributes and one or more contextual attributes that combine to describe the first individual property wherein each static attribute has a corresponding static attribute value and each contextual attribute has a corresponding contextual attribute value, wherein a static attribute associated with the first individual property is immutable and has the same static attribute value within all schemas that include the first individual property, wherein a contextual attribute is able to have different contextual attribute values among different schemas that include the first individual property, and wherein contextual attribute values are defined within each schema that has the contextual attribute;

a property reference element describing a second individual property of the data store by referencing a second property description element from a second schema that includes static attributes and corresponding static attribute values wherein the property reference specifies contextual attributes and corresponding contextual attribute values, wherein the static attributes apply to all schemas that reference the second property description element, and wherein the contextual attributes apply only to the first schema:

an item type description element describing an item type for at least one item in the data store, the item type description element including one or more properties that define the item type; and a kind description element describing a kind for at least one item in the data store, the kind description element including one or more properties for the kind, wherein the kind is a collection of logically related item types.

10. The one or more computer-storage media of claim 9, where the data structure further comprises a property description list element that is a list of all new properties defined in the first schema.

11. The one or more computer-storage media of claim 9, where the data structure further comprises a property reference list element that acts as a container for one or more property reference elements within the first schema.

12. The one or more computer-storage media of claim 9, wherein the first property description element includes a related property element that defines a relationship between the first property description element and another property description element, wherein the related property element includes attributes to identify related property description elements and describe a type of relationship between property descriptions elements.

13. The one or more computer-storage media of claim 9, where the data structure further comprises an item type description list element that that acts as a container for one or more item type elements within the first schema.

14. The one or more computer-storage media of claim 9, where the data structure further comprises a kind description list element that lists kind descriptions defined within the first schema.

15. One or more computer-storage media storing a first schema for describing a data store, the first schema being useable to interact with the data store, the first schema comprising:

a property description element describing a first property of the data store, the property description element including both static attributes that describe the first property for any schema having the first property and contextual attributes that describe the first property only for the first schema, wherein each static attribute has a corresponding static attribute value and each contextual attribute has a corresponding contextual attribute value wherein a static attribute associated with the first individual property is immutable and has the same static attribute value within all schemas that include the first individual property, wherein a contextual attribute is able to have different contextual attribute values among different schemas that include the first individual property, and wherein contextual attribute values are defined within each schema that has the contextual attribute;

a property reference element describing a second property of the data store by referencing a second property description element from a second schema that includes static attributes and corresponding static attribute values, wherein the property reference element specifies contextual attributes and corresponding contextual attribute values, wherein the static attributes apply to all schemas that reference the second property description, and wherein the contextual attributes apply only to the first schema an item type description element describing an item type for at least one item in the data store, the item type description element including one or more properties that define the item type; and a kind description element describing a kind for at least one item in the data store, the kind description element including one or more properties for the kind, wherein the kind is a collection of logically related item types.

16. The one or more computer-storage media of claim 15, wherein the property description element includes a related property element that defines a relationship between the property description element and another property description element wherein the related property element includes attributes to identify related property description elements and describe a type of relationship between property descriptions elements.

* * * * *